United States Patent [19]

MacDonald

[11] E Re. 28,786

[45] Reissued Apr. 27, 1976

[54] HINGE FOR LATCHLESS DOOR

[75] Inventor: Robert D. MacDonald, Grand Blanc, Mich.

[73] Assignee: Cardinal of Adrian, Inc., Dryden, Mich.

[22] Filed: May 13, 1975

[21] Appl. No.: 575,774

Related U.S. Patent Documents

Reissue of:

[64] Patent No.: 3,212,124
Issued: Oct. 19, 1965
Appl. No.: 405,016
Filed: Oct. 12, 1964

U.S. Applications:

[63] Continuation of Ser. No. 203,944, June 20, 1962, abandoned.

[52] U.S. Cl. ..... 16/141; 16/147

[51] Int. Cl.[2] ..... E05D 11/08

[58] Field of Search ..... 16/137, 138, 139–145, 16/180, 190, 147; 312/138, 138 A, 109; 220/35

[56] References Cited

UNITED STATES PATENTS

| | | | |
|---|---|---|---|
| 324,444 | 8/1885 | Wolf | 16/141 |
| 400,540 | 4/1889 | Boughn et al. | 16/141 |
| 472,483 | 4/1892 | Loomis | 16/141 |
| 725,435 | 4/1903 | Gamache | 16/142 |
| 1,122,322 | 12/1914 | Smith | 16/190 |
| 2,243,772 | 5/1941 | Pettier | 312/138 A UX |
| 2,522,897 | 9/1950 | Rotter | 220/35 |
| 2,867,841 | 1/1959 | Baldauf | 16/140 X |
| 2,992,451 | 7/1961 | Schonitzer et al. | 16/141 |
| 2,999,268 | 9/1961 | Strandengen | 16/141 |

FOREIGN PATENTS OR APPLICATIONS

| | | | |
|---|---|---|---|
| 904,420 | 8/1962 | United Kingdom | 16/147 |
| 5,590 | 5/1891 | United Kingdom | |
| 5,011 | 4/1900 | United Kingdom | |
| 531,951 | 8/1955 | Italy | |

*Primary Examiner*—Andrew V. Kundrat
*Attorney, Agent, or Firm*—Cullen, Settle, Sloman & Cantor

EXEMPLARY CLAIM

4. A hinge to pivotally connect a door to a frame in a manner such that the door will close tightly without a latch, said hinge comprising a first portion and a second portion, said first portion having a first flange, a first ear, and a connection between said flange and said ear, one of said portions being attachable to the frame and the other portion being attachable to the door, *said connection between said first flange and said first ear being of sufficient length to space the hinged end of the door from the frame in the closed position of the door when the door has been pivotally connected to the frame*, said first portion being attachable along any part of said frame or said door, said second portion including a second flange, a second ear on one side of said second flange connected to said second flange, said first ear and said second ear being pivotally connected by a hinge pin, guide means extending from said second flange, a *plunger* [ pressure member ] carried by said second portion and guided with the aid of said guide means in a direction toward and away from said hinge pin, spring means carried by said second portion urging said *plunger* [ pressure member ] toward said hinge pin, said ear of said first portion having an arcuate portion and an engageable edge to be engaged by said *plunger*, [ pressure member ] said edge being positioned so that the force of said spring means acting through said *plunger* [ pressure member ] and said edge can be directed to one side of said hinge pin to produce a torque tending to move the door beyond its closed position, when the door is closed, and said arcuate portion being *continuous from one end thereof at its juncture with said edge to its other end and being of sufficient length to have portions thereof receive* [ positioned so that ] the force of said spring means acting through said *plunger against said arcuate portion and* [ pressure member can be ] directed through said hinge pin when said door is in any open position *between the near-closed position and the fully open position* and said *plunger* [ pressure member ] is spaced from said edge.

6 Claims, 5 Drawing Figures

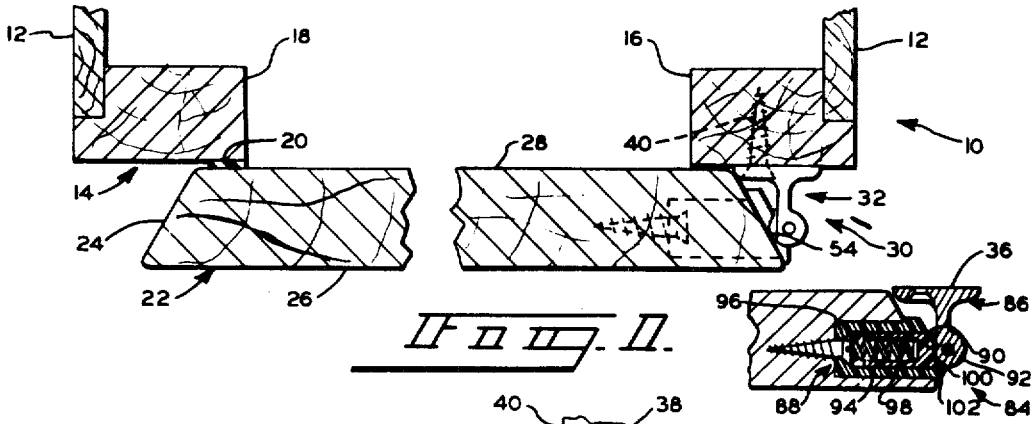
Fig. 1.
Fig. 4.
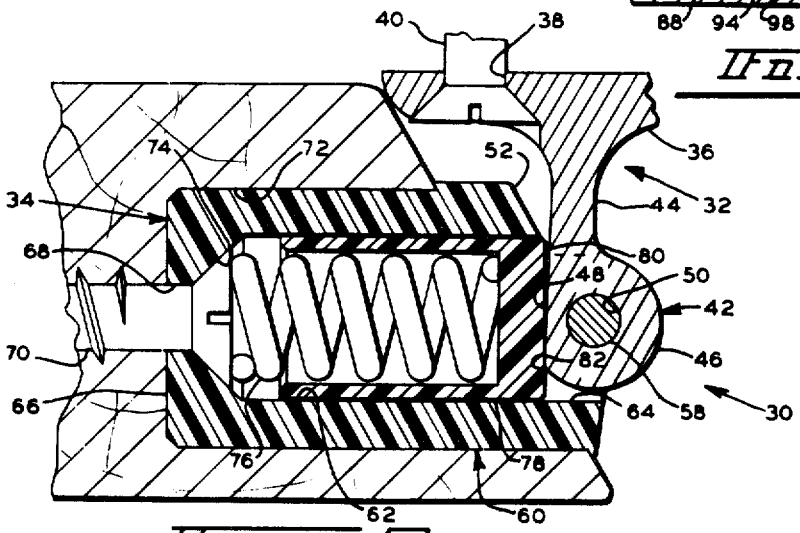
Fig. 2.
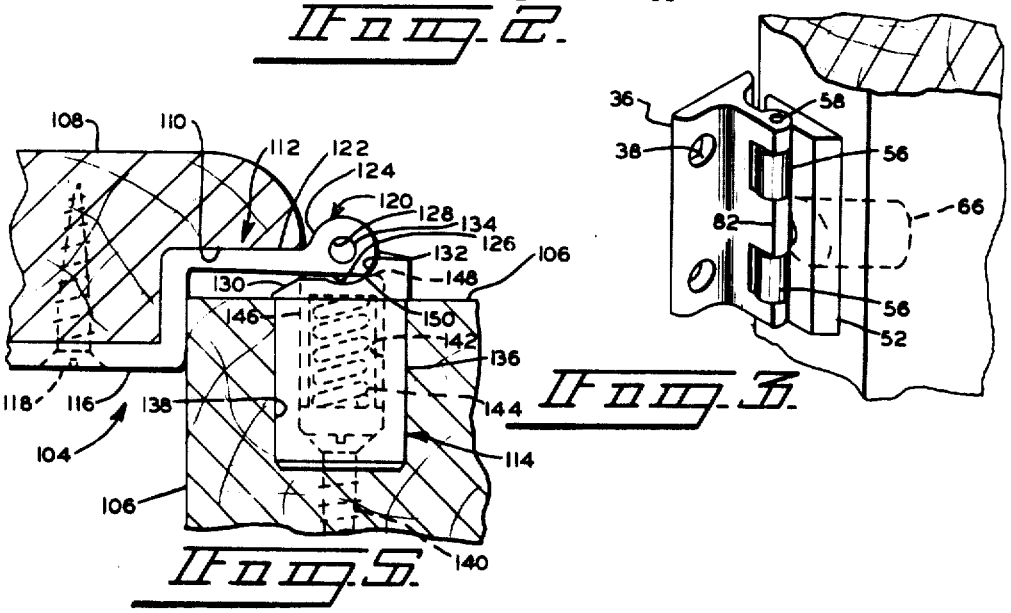
Fig. 5.
Fig. 3.

HINGE FOR LATCHLESS DOOR

Matter enclosed in heavy brackets [ ] appears in the original patent but forms no part of this reissue specification; matter printed in italics indicates the additions made by reissue.

This application is a continuation of my co-pending application, Ser. No. 203,944 filed June 20, 1962 and now abandoned.

This invention relates to a door hinge and more particularly to a hinge for a latchless cabinet door or the like.

A hinge according to the invention is designed to enable a door with which it is used to be closed tightly without any latch whatsoever. This is made possible by a spring associated with the hinge which is designed to engage a surface thereof in a manner such that the door is urged past its normally-closed position. In this manner, the door, when closed, is always urged tightly against the door stop member. By eliminating the necessity for a latch, the expense of the latch is eliminated along with the cost of installation which requires close alignment of the latch and its striker which requires considerable care and can be quite time-consuming. This resulting reduction in production costs is particularly of importance for kitchen cabinets and the like, which is now highly competitive. Further, with elimination of the latch, the latch members cannot get out of alignment due to such factors as wear, bumping, or changes in the weather which cause contraction or expansion of either the door or door frame, or both. The door also will shut tightly whether it is closed softly or slammed, which is not true of most latches now commercially available. In fact, a door with hinges according to the invention won't even bounce in most instances regardless of how hard it is slammed.

It is, therefore, a principal object of the invention to provide an improved door hinge to enable a door to function without any latch whatsoever.

Many other objects and advantages of the invention will be apparent from the following detailed discussion of preferred embodiments thereof, reference being made to the accompanying drawings, in which:

FIG. 1 is a fragmentary view in horizontal cross section of a cabinet and a door employing a hinge according to the invention;

FIG. 2 is a greatly enlarged, fragmentary view in horizontal cross section taken through the center of the hinge shown in FIG. 1;

FIG. 3 is a fragmentary view in perspective of the hinge and door shown in FIGS. 1 and 2, but with the door in an open position;

FIG. 4 is a somewhat schematic view in cross section of a slightly modified hinge embodying the principles of the invention; and FIG. 5 is a fragmentary view in horizontal cross section similar to FIG. 1, but showing another modified hinge and a modified door.

Referring to the drawing, and more particularly to FIG. 1, a cabinet indicated at 10 includes side walls 12 and a front cabinet frame indicated at 14, including a hinge member 16 and a door stop member 18. The door stop member 18 includes a suitable door stop bumper 20.

A door 22, which is slightly larger than the cabinet opening has beveled edges 24 which are at an angle of about 60° to major surfaces 26 and 28 of the door. The beveled edges 24 have the advantage that the door handle can be eliminated because one can easily open the door by grasping it at the edges 24. The beveled edges also produce an attractive appearance for the cabinet and any warping of the door, resulting in a non-uniform gap between the door and the frame, also is less noticeable with the beveled edges.

A butt hinge 30 for the door 22 includes a first portion indicated at 32 which is attached to the hinge member 16 and a second portion 34 affixed to the door 22. The first portion 32 includes a fastening flange 36 having openings 38 therein to receive screws 40 which are turned into the hinge member 16 to affix the first hinge portion 32 thereto. The portion 32 also includes pin-receiving ears 42 which are connected to the flange 36 by a web connection 44. At least the middle ear 42, except where connected to the web 44, includes an arcuate surface 46 and a flat surface 48. At least part of the arcuate surface 46 has its center located at the axis of a hinge pin passage 50 which extends through all three of the ears 42. The flat surface 48 of the ear 42 lies at an angle of approximately 3° to a plane perpendicular to the connecting flange 36 or the front surface of the hinge member 16. The angle of the flat surface 48 can vary between approximately 2° and 10° and yet attain satisfactory operation of the hinge 30.

The second hinge portion 34 includes a face flange 52 which has a longitudinally-extending arcuate groove 54 (FIG. 1.) to receive the ears 42 of the first hinge portion 32. The face flange 52 also has two ears 56 of any suitable configuration which are positioned along the groove 54 in a manner to be inserted between the first ears 42, as shown in FIG. 3. The ears 56 also have a second hinge pin passage which is aligned with the first passage 50 to enable the first and second portions 32 and 34 to be pivotally attached by a hinge pin 58. A spring cylinder 60 extends from the rear of the face flange 52 and at an angle of approximately 60° so that the cylinder 60 will be parallel to the door when the face flange 52 lies parallel to the beveled edge 24 of the door 22. The spring cylinder 60 forms an inner guide passage 62 which terminates in a front opening 64 at the point where it intersects the face flange 52. The opposite end of the cylinder 60 terminates in an end wall 66 having a screw-receiving opening 68 therein which receives a screw 70 to affix the cylinder 60 in a door bore 72. The screw-receiving opening 68 has a bevel 74 which enables the screw head to lie flush and provide a flat end surface for a hinge spring 76. The spring 76 extends into a plunger [or pressure member] 78 which is located in the guide passage 62 and can move longitudinally therein. The plunger 78 has a flat outer end 80 which lies at a slight angle to the flat surface 48 of the ear 42 when the door 22 is closed.

When the door 22 is open, as shown in FIG. 3, the plunger 78 contacts the arcuate surface 46 and has no appreciable affect upon the opening and closing of the door 22. Only a slight drag results from the contact of the plunger 78 and the arcuate surface 46, which drag is minimal because the plunger 78 is made of a plastic material such as nylon or Teflon. This keeps friction to a minimum and also prevents marring of the metal hinge portion 32 which would otherwise occur if the ear 42 were engaged by a metal plunger in place of the plastic plunger 78. A noticeable streak would soon appear on the arcuate surface 46 of the ear 42.

As the door 22 is moved toward the closed position and reaches an angle of about 25 to 30° to the front cabinet frame 14, the face 80 of the plunger 78 will contact only a projecting edge or engageable part 82 of the ear 42 which is formed at the meeting line of the flat surface 48 and the arcuate surface 46. When this occurs, the force of the spring 76, which can be about thirty-five pounds for a cabinet door, will act entirely on the projecting edge 82 and the line of the force will pass outside the hinge pin 58. When this point is reached, torque is produced which urges the door 22 toward the closed position. This torque increases as the door continues to close since the line of force extends farther to the side of the pin 58 so that the effective lever arm of the force is increased. The lengthening of the lever arm more than overcomes any slight decrease in the spring force as the plunger 78 moves slightly outwardly. Consequently, when the door 22 reaches the door stop member 18 or the bumper 20, it stays closed no matter how softly or strongly the door is shut. Tests indicate that the door will not bounce no matter how hard it is slammed, although this might occur to a slight extent if a highly resilient bumper were employed.

In assembling the hinge 30 with the door 22 and the frame member 16, the door bore 72 is first drilled in the hinge edge 24 of the door. In this instance, the bore 72 is slightly closer to the outside major surface 26 than the inside major surface 28 so that the inner major surface 28 lies close to the hinge member 16. The cylinder 60 is then inserted into the bore 72 until the face flange 52 is contiguous with the beveled edge 24 and the screw 70 is inserted into the hole 68 and turned into the wood to hold the cylinder 62 and the face flange 52 securely with respect to the door. The cylinder and face flange cannot turn even though only one screw is used, because the face flange 52 lies contiguous with the beveled edge 24 and would be distorted if turning were attempted. The first portion 32 of the hinge 30 is then positioned and affixed to the frame member 16, after which the spring 76 and the plunger 78 are pushed into the guide passage 62. The ears 56 and 42 are then assembled with the pin passages aligned, after which the hinge pin 58 is inserted to complete the assembly.

A slightly modified hinge is shown somewhat schematically in FIG. 4. In this instance, a hinge indicated at 84 includes a slightly modified first portion 86 and a modified second portion 88. The first portion 86 is substantially the same as the first portion 32 of the hinge 30 except that a flat surface 90 of an ear 92 lies perpendicular to the flange 36 or the frame member 16 rather than at a slight angle thereto. The second portion 88 is similar to the second portion 34 of the hinge 30 except that a cylinder 94 forms a non-circular guide passage 96 containing a non-circular plunger 98. The plunger 98 has a slightly slanted surface 100 which lies at an angle of about 3° to a plane perpendicular to the flange 36 or the members 16, an angle between 2° and 10° being suitable.

As is true of the hinge 30, the hinge 84 operates in a substantially normal manner when the door is open, only a slight drag resulting between the contact of the plunger 94 and the ear 92. However, as the door is moved toward a closed position, the plunger 98 contacts a projecting edge or engageable part 102 between the arcuate and the flat surface 90 of the ear 92. The force of the spring 76 then acts through the plunger 96 and the projecting edge 102 on a line outside the hinge pin, thereby again establishing a torque which tends to close the door 22 with the torque increasing as the door closes further. The guide passage 96 and the plunger 98 are non-circular so that the slanted end 100 of the plunger will always remain in the proper position with respect to the edge 102.

If desired, both the flat surface of the ear and the end surface of the plunger can be slightly slanted to produce the diverging relationship of the two surfaces with an angle of about 2° to 10° between them.

An offset hinge 104 embodying the principles of the invention is shown in FIG. 5. The hinge 104 is used with a cabinet frame member 106 and an offset door 108 which has an edge groove 110 to fit with the frame member 106 in a manner well known in the art. The hinge 104 includes a first portion 112 and a second portion 114 corresponding to the two portions 32 and 34 of the hinge 30. The first portion 112 has an L-shaped fastening flange 116 having openings therein for screws 118. The first portion 112 also has ears 120 connected to the flange 116 by a web connector 122. Each of the ears 120, except where attached to the web connection 122, includes an arcuate surface 124 and a flat surface 126. The center of at least part of the arcuate surface 124 is at the axis of a pin-receiving passage 128 which extends through all of the ears 120. The flat surface 126 diverges from the frame member 106 in the direction of the door opening at an angle of about 3°, although 2° to 10° is satisfactory.

The second portion 114 of the hinge 104 includes a face flange 130 positioned against the face of the frame member 106 with an arcuate groove 132 to receive the ears 120. The second portion 114 also has ears extending between the ears 120 of the first portion with hinge pin passages aligned with the passages 128 to receive a hinge pin 134 which provides a pivotal connection between the two portions 112 and 114. A cylinder 136 extends rearwardly from the face flange 130 and, in this instance, is perpendicular thereto, being fastened in a bore 138 by an end screw 140. The cylinder 136 forms a guide passage 142 in which is located a spring 144 and a plunger 146. The plunger 146 has a flat end 148 which contacts a projecting edge or engageable part 150 as the door 108 is moved toward its closed position. The force of the spring 144 is along a line on the right hand side of the pin 134 to produce a torque tending to close the door, this torque increasing as the door moves toward its closed position. As in the previous embodiments, the door remains tightly closed because the torque is still applied, even when it is closed, and the door will not bounce back, no matter how hard it is slammed.

It may be noted that in all embodiments, either the end of the plunger or the flat surface of the ear of the first portion lies at an angle to a plane perpendicular to the direction of movement of the plunger in the guide passage formed by the cylinder. Further, the configuration is such that the plunger will contact the engageable part in a manner such that the force of the spring will be directed to one side of the hinge pin axis so as to produce a torque which tends to close the door.

Various modifications of the above described embodiments of the invention will be apparent to those skilled in the art and it is to be understood that such modifications can be made without departing from the scope of the invention, if they are within the spirit and the tenor of the accompanying claims.

I claim:

[ 1. A hinge to pivotally connect a door to a frame in a manner such that the door will close tightly without a latch, said hinge comprising a first portion and a second portion, said first portion having a fastening flange, a first ear, and a connection between said flange and said first ear, one of said portions being attachable to the frame and the other portion being attachable to the door, said second portion including a face flange, a second ear extending outwardly from said face flange, said first and second ears being pivotally connected by a hinge pin, a cylinder extending outwardly from said face flange and forming a guide passage, a plunger in said guide passage for slidable movement therein longitudinally of said passage, spring means in said cylinder urging said plunger out of said passage and generally toward said hinge pin, said plunger having a generally flat outer end, said first portion having an arcuate surface and a generally flat surface in the path of said plunger to be engaged by the flat outer end of said plunger, said flat end engaging said arcuate surface when said door is in an open position to aid in holding said door in an open position, said flat end and said flat surface lying in non-parallel, diverging relationship so that the force of the spring means acting through said plunger and said flat surface of said first portion will be directed to one side of said hinge pin when the door is closed to produce a torque tending to move the door beyond the closed position. ]

2. In combination, a cabinet having a front opening, a door hinge frame member at one side of the front opening of said cabinet, a latchless door stop frame member at the opposite side of said opening of said cabinet, a latchless cabinet door, opposite vertical edges of which extend beyond the inner edges of said door hinge frame member and said door stop frame member, said door being spaced from said door hinge frame member for all positions, including the closed position, a hinge for pivotally supporting said door from said door hinge frame member, said hinge comprising a first portion and a second portion which are pivotally connected by a hinge pin, one of said portions being attached to the hinge frame member and the other portion being attached to the door, said portions being spaced apart for all positions of the door including the closed position, said first portion having an arcuate surface and engageable means, said second portion carrying spring means urged toward said arcuate surface and said engageable means to direct a force against said surface to produce drag on said first portion when the door is in [ an ] *at least a substantially fully* open position *said arcuate surface being continuous from one end thereof at its juncture with said engageable means to its other end and being of sufficient length to have portions thereof receive the force of said spring means acting against said arcuate surface and directed through said hinge pin when the door is in said substantially fully open position*, and to direct a force through said engageable means when the door is in a closed position, said engageable means being arranged to direct the force to one side of said hinge pin when the door is closed, and also to direct the force to the same side of said hinge pin when the door is [ partially opened ] *nearly closed*, thereby producing torque tending to urge the door beyond the closed position and beyond said door stop frame member, and stop means projecting outwardly from one of said door and said door stop frame member and positioned to engage the other of said door and said door stop frame member to stop said door in the closed position and prevent said door from moving beyond said stop means toward said door stop frame member.

[ 3. In combination, a cabinet having a front opening, a door hinge frame member at one side of the front opening of said cabinet, a latchless door stop frame member at the opposite side of said opening of said cabinet, a latchless cabinet door, opposite vertcal edges of which extend beyond the inner edges of said door hinge frame member and said door stop frame member, said door being spaced from said door hinge frame member for all positions, including the closed position, a hinge for pivotally supporting said door from said door hinge frame member, said hinge comprising a first portion and a second portion which are pivotally connected by a hinge pin, one of said portions being attached to the hinge frame member and the other portion being attached to the door, said portions being spaced apart for all positions of the door including the closed position, said first portion having engageable means spaced farther from said hinge pin than part of said first portion immediately adjacent said engageable means, said second portion carrying spring means urged toward said engageable means to direct a force through said engageable means when the door is in a closed position and in a partially open position with the door located at an angle of not more than about thirty degrees to a plane through said frame members, said engageable means and said part being arranged to direct the force to one side of said hinge pin only when the door is closed and when the door is partially opened, thereby producing torque tending to urge the door beyond the closed position and beyond said door stop frame member, said spring means being spaced from said engageable means when said door is more fully opened, and stop means projecting from one of said door and said door stop frame member and positioned to contact the other of said door and said door stop frame member to stop said door in the closed position and prevent said door from moving beyond said stop means and said door stop frame member and to space said door from said door stop frame member when said door is closed. ]

4. A hinge to pivotally connect a door to a frame in a manner such that the door will close tightly without a latch, said hinge comprising a first portion and a second portion, said first portion having a first flange, a first ear, and a connection between said flange and said ear, one of said portions being attachable to the frame and the other portion being attachable to the door, *said connection between said first flange and said first ear being of sufficient length to space the hinged end of the door from the frame in the closed position of the door when the door has been pivotally connected to the frame*, said first portion being attachable along any part of said frame or said door, said second portion including a second flange, a second ear on one side of said second flange connected to said second flange, said first ear and said second ear being pivotally connected by a hinge pin, guide means extending from said second flange, a [ pressure member ] *plunger* carried by said second portion and guided with the aid of said guide means in a direction toward and away from said hinge pin, spring means carried by said second portion urging said [ pressure member ] *plunger* toward said hinge pin, said ear of said first portion having an arcuate portion and an engageable edge to be engaged by said [ pressure member ] *plunger*, said edge being positioned so that the force of said spring means acting ırough said [ pressure member ] *plunger* and said dge can be directed to one side of said hinge pin to roduce a torque tending to move the door beyond its losed position, when the door is closed, and said arcute portion being [ positioned so that ] *continuous rom one end thereof at its juncture with said edge to its ther end and being of sufficient length to have portions hereof receive* the force of said spring means acting ırough said [ pressure member can be ] *plunger gainst said arcuate portion and* directed through said inge pin when said door is in any open position *beween the near-closed position and the fully open position* nd said [ pressure member ] *plunger* is spaced from aid edge.

[ 5. A hinge according to claim 4 wherein said first ortion is made of metal and at least the engageable ortion of said pressure member is made of plastic aterial. ]

6. A hinge to pivotally connect a door to a frame in manner such that the door will close tightly without a atch, said hinge comprising a first portion and a second ortion, said first portion having a first flange, a first ar, and a connection between said flange and said ear, ne of said portions being attachable to the frame and he other portion being attachable to the door, *said onnection between said first flange and said first ear eing of sufficient length to space the hinged end of the oor from the frame in the closed position of the door hen the door has been pivotally connected to the frame,* aid second portion including a second flange, a second ar on one side of said second flange connected to said econd flange, said first ear and said second ear being ivotally connected by a hinge pin, a [ pressure mem- er ] *plunger* having a recess, said [ member ] *lunger* being carried by said second portion and mov- ble in a direction toward and away from said hinge in, a coil spring carried by said second portion extend- ng into said recess and urging said [ pressure mem- er ] *plunger* toward said hinge pin, said ear of said irst portion having an arcuate portion and an engage- ble edge to be engaged by said [ pressure member ] *lunger*, said edge being positioned so that the force of aid coil spring acting through said [ pressure mem- er ] *plunger* and said edge can be directed to one side f said hinge pin to produce a torque tending to move he door beyond its closed position, when the door is losed, and said arcuate portion being [ positioned so hat ] *continuous from one end thereof at its juncture ith said edge to its other end and being of sufficient ength to have portions thereof receive* the force of said oil spring acting through said [ pressure member can e ] *plunger against said arcuate portion and* directed hrough said hinge pin when said door is in any open osition *between the near-closed position and the fully pen position* and said [ pressure member ] *plunger* is paced from said edge.

*7. In combination, a cabinet having a front opening in vertical plane, a door hinge frame member at one ide of the front opening of said cabinet, a latchless oor stop frame member at the opposite side of said pening of said cabinet, a latchless cabinet door, pposite vertical edges of which extend beyond he inner edges of said door hinge frame member nd said door stop frame member, said door being nounted in a spaced relationship from said door inge frame member for all positions, including the losed position, a hinge pivotally supporting said door in paced relationship from said door hinge frame member, aid hinge comprising a first portion and a second portion which are pivotally connected by a hinge pin having a vertical axis, one of said portions being attached to the hinge frame member and the other portion being attached to the door, said portions being spaced apart for all positions of the door including the closed position, said first portion having an arcuate surface concentric with the axis of said hinge pin and an engageable edge, said second portion carrying spring means urged against said arcuate surface, said arcuate surface being continuous from one end thereof at its juncture with said engageable edge to its other end and being of sufficient length to have portions thereof receive the force of said spring means against said arcuate surface and directed through said hinge pin axis to produce drag on said arcuate surface when the door is in any open position between the near-closed position and at least a substantially fully open position to thereby hold the door in any such open position in which it is left, without any tendency to fly to another position, and said spring means being urged toward and against said engageable edge to direct a force through said engageable edge when the door is in a near-closed and closed position, said engageable edge being arranged to direct the force of said spring means to one side of said hinge pin axis when the door is nearly closed and closed, thereby producing torque to close the door and tending to urge the door beyond the closed position and beyond said door stop frame member, to assure full closing of the door and to hold the door fully closed, and stop means projecting outwardly from one of said door and said door stop frame member and positioned to engage the other of said door and said door stop frame member to stop said door in the closed position and prevent said door from moving beyond said stop means toward said door stop frame member.*

*8. A hinge capable of being sold as a separate article of commerce and adapted for attachment to a cabinet door and frame to pivotally connect the door to the frame in a manner such that the door will close tightly without a latch, said hinge comprising a first portion and a second portion, said first portion having a first flange, a first ear, and a connection between said flange and said ear, one of said portions being attachable to the frame and the other portion being attachable to the door, said connection between said first flange and said first ear being of sufficient length to space the hinged end of the door from the frame in the closed position of the door when the door has been pivotally connected to the frame, said first portion being attachable along any part of said frame or said door, said second portion including a second flange, a second ear on one side of said second flange connected to said second flange, said first ear and said second ear being pivotally connected by a hinge pin, guide means extending from said second flange, a plunger carried by said second portion and guided with the aid of said guide means in a direction toward and away from said hinge pin, spring means carried by said second portion urging said plunger toward said hinge pin, said ear of said first portion having an arcuate portion concentric with the axis of said hinge pin and an engageable edge to be engaged by said plunger, said edge being positioned so that, when the door is in the near-closed and fully-closed positions, the force of said spring means acting through said plunger will be applied against said edge and will be directed to one side of said hinge pin to produce a torque to close the door and tending to move the door beyond its closed position, when the door is closed, to assure full closing of the door and to hold the door fully closed, and said arcuate portion being continuous from one end*

*thereof at its juncture with said edge to its other end and being of sufficient length to have portions thereof receive the force of said spring means acting through said plunger against said arcuate surface and directed through the axis of said hinge pin when said door is in any open position between the near-closed position and the fully-open position and said plunger is spaced from said edge, to thereby hold the door in any such open position in which it is left, without any tendency to fly to another position.*

*9. A hinge capable of being sold as a separate article of commerce and adapted for attachment to a cabinet door and frame to pivotally connect the door to the frame in a manner such that the door will close tightly without a latch, said hinge comprising a first portion and a second portion, said first portion having a first flange, a first ear, and a connection between said flange and said ear, one of said portions being attachable to the frame and the other portion being attachable to the door, said connection between said first flange and said first ear being of sufficient length to space the hinged end of the door from the frame in the closed position of the door when the door has been pivotally connected to the frame, said second portion including a second flange, a second ear on one side of said second flange connected to said second flange, said first ear and said second ear being pivotally connected by a hinge pin, a plunger having a recess, said plunger being carried by said second portion and movable in a direction toward and away from said hinge pin, a coil spring carried by said second portion extending into said recess and urging said plunger toward said hinge pin, said ear of said first portion having an arcuate portion concentric with the axis of said hinge pin and an engageable edge to be engaged by said plunger, said edge being positioned so that, when the door is in the near-closed and fully-closed positions, the force of said coil spring acting through said plunger will be applied against said edge and will be directed to one side of said hinge pin to produce a torque to close the door and tending to move the door beyond its closed position, when the door is closed, to assure full closing of the door and to hold the door fully closed, and said arcuate portion being continuous from one end thereof at its juncture with said edge to its other end and being of sufficient length to have portions thereof receive the force of said coil spring acting through said plunger against said arcuate surface and directed through the axis of said hinge pin when said door is in any open position between the near-closed position and the fully open position and said plunger is spaced from said edge, to thereby hold the door in any such open position in which it is left, without any tendency to fly to another position.*

* * * * *